Patented June 10, 1930

1,763,410

UNITED STATES PATENT OFFICE

GEORG SCHROETER, OF BERLIN, GERMANY, ASSIGNOR TO NEWPORT MANUFACTURING COMPANY, OF CARROLLVILLE, WISCONSIN, A CORPORATION OF DELAWARE

PURIFICATION OF NAPHTHALENE

No Drawing. Original application filed August 29, 1921, Serial No. 496,639, and in Germany February 24, 1915. Divided and this application filed March 27, 1925. Serial No. 18,902.

(GRANTED UNDER THE PROVISIONS OF THE ACT OF MARCH 3, 1921, 41 STAT. L., 1313)

I have filed applications, in Germany February 24, 1915 (Patent No. 324,861 issued to assignee, Tetralin G.m.b.H.); in Germany December 7, 1915 (Patent No. 324,862 issued to assignee, Tetralin G.m.b.H.); in Germany May 13, 1916 (Patent No. 324,863 issued to assignee, Tetralin G.m.b.H.; and in Belgium, filed May 31, 1920; in France, filed May 21, 1920; in England, filed July 8, 1920; in Italy, filed June 30, 1920; in Austria, filed April 15, 1920; in Hungary, filed July 31, 1917; in Netherlands, filed April 21, 1920; in Switzerland, filed June 30, 1920; and in Czechoslovakia, filed July 10, 1920.

The present invention relates to purification of commercial naphthalene, and particularly to a purification thereof to an extent sufficient to remove therefrom elements which act as catalyzer poisons when the naphthalene is subjected to hydrogenation in the presence of a catalyst. The present application is a division of my co-pending application Ser. No. 496,639, filed August 29, 1921, which was granted to me on April 27th, 1926, as Patent No. 1,582,310.

It has long been known that even the purest commercial (i. e. technically produced) naphthalene stubbornly retains certain small amounts of impurities, especially methylated coumarone and corresponding sulfur compounds, which substances cause a red coloration when commercial naphthalene is subjected to treatment with hot concentrated sulfuric acid. It was known that by boiling commercial naphthalene with acetate of mercury in alcoholic solution, certain mercury compounds were produced which were not mercury compounds of thionaphthalene. It has also previously been known that ordinary purified naphthalene contains sulfur compounds and it has been proposed to purify naphthalene from these sulfur compounds by repeated crystallization from various organic solvents. Such processes would, however, not be commercially feasible in connection with the commercial hydrogenation of naphthalene.

In accordance with the present invention, the naphthalene treated, namely, commercial or technical naphthalene, can be purified by treating it in a molten state with fuller's earth, infusorial earth, animal charcoal or the like, that is, any porous and finely-divided material, which naturally contains small quantities of metal oxides, such as lime, and which material is also capable of absorbing or adsorbing coloring matters, resinous substances or other materials of high molecular weight. The naphthalene can then be removed by filtering or by distillation at a temperature which is not sufficiently high to cause undesired side reactions, for example in vacuo. This purification may sometimes not be sufficiently complete and a more complete purification can be effected by the use, instead of the above mentioned porous materials alone, of fuller's earth upon which is precipitated a small amount, say, 1 or 2 per cent or so, of reduced nickel, reduced iron or other like metal. During this purification step, it is advisable to agitate by stirring, pumping etc. in the presence of hydrogen. The temperature in this operation should be kept above 100° C. These metals can also be used alone in a finely-divided state for the purification of naphthalene. Another method of purifying the naphthalene, which reduces the impurities to a very small quantity, involves the treatment of the molten naphthalene with small percentages of metallic sodium or potassium or other easily melted metals of like properties. In this operation it is advisable to treat the molten naphthalene with, say, from one-half to one and one-half percent of metallic sodium or potassium at a temperature above 100° C., for several hours.

Another useful method of purifying the naphthalene is by treating the same in a molten state (after a preliminary distillation if desired) with small amounts of metal compounds which contain a metal loosely combined with a non-acid radical or element. Examples of such compounds are the metal-ammonia compounds, metal amids (such as sodium or potassium amid), metal carbides (such as aluminium or calcium carbides), or other metal compounds of acetylene.

It is, of course, to be understood that these various methods of purification above given can be used each by itself, or two or more of these methods can be used in conjunction with each other.

Naphthalene purified according to the above processes does not produce any red coloration when treating with concentrated sulfuric acid. If it is found that the purification of a particular batch has not been sufficiently completed, it is advisable to again subject this material to a retreatment according to one or the other of the above mentioned processes.

The naphthalene, after its purification, can be separated from the residue of the purifying agents, or from the compounds produced by the union of the impurities with the purifying agents, by hot pressure filtration in hydrogen, or by distillation at a relatively low temperature, distillation in vacuo being a preferred mode of operation.

The purified naphthalene can then be subjected to hydrogenation in the presence of finely-divided nickel as a catalyst, or otherwise, in accordance with the methods set forth in my application above referred to, without injury to the catalyst. It may be added that the purification of naphthalene from those substances which produce red coloration upon treatment with sulfuric acid, not only makes the catalyzer last better, that is to say—retain its usefulness for a long period, but also renders the hydrogenation of the naphthalene much easier and more readily controlled.

The highly impure varieties of naphthalene which gives a deep red color with sulfuric acid, can be purified according to the processes herein described, and subsequently hydrogenated.

The following examples of procedure falling within the scope of the present invention are given for the purpose of more fully explaining the matter of the invention, but the scope of the invention is not limited to these specific examples:

*Example 1.*—100 kilos of commercial naphthalene, e. g., that obtained by hot pressing naphthalene press cake, are stirred in an autoclave with 1% of nickel or iron which has been precipitated on an extending material, such as argillaceous earth, and subjected to hydrogen under pressure for three hours at 150 to 180° C., whereupon the naphthalene is distilled off under reduced pressure from the purifying agents, after it has been shown by a sulfuric acid test (see above) that the purification is complete.

*Example 2.*—100 kilos of commercial naphthalene are placed in a kettle or boiler with a distilling tube and receiver to be connected therewith and mixed with 750 grams (three quarters of one per cent) of sodium and stirred for 2 or 3 hours at 180 to 200° C., whereupon the naphthalene is distilled off in vacuo. This gives a very complete purification of the naphthalene from catalyzer poisons. In this example the sodium can be used with the finely divided porous materials if desired.

It will be understood that while I have described certain preferred ways of carrying into effect my invention, I do not limit my invention to these specific methods. It is to be understood that the term "suitable treating agent" as used in the following claims is meant to include such substances as are indicated in the foregoing specification for the purification of naphthalene. To recapitulate, these "suitable treating agents" are:

(1) Fuller's earth, infusorial earth, animal charcoal or the like, that is any porous and finely divided material, which naturally contains small quantities of metal oxides, such as lime and which material is also capable of absorbing or adsorbing coloring matter;

(2) Fuller's earth upon which is precipitated a small amount of reduced nickel or iron or other like metal;

(3) Finely divided iron or nickel or other like metal;

(4) Metallic sodium or potassium or other easily melted metals of like property;

(5) Metals loosely combined with a non-acid radical or element as metal ammonia compounds, metal amides, metal carbides, as defined in the specification; and (6) Mixtures of any of the above five groups.

The aforesaid metals are all characterized by having an affinity for impurities, such as sulphur and sulphur compounds, which inhibit hydrogenation or affect it adversely.

With this understanding I claim as my invention:

1. A process of treating naphthalene to remove those impurities which act as catalyzer poisons on hydrogenation in the presence of a hydrogenation catalyst, which comprises subjecting the naphthalene at a temperature above its melting point, to the action of an alkali metal capable of substantially removing said impurities from the naphthalene.

2. A process of treating naphthalene to remove those impurities which act as catalyzer poisons on hydrogenation in the presence of a hydrogenation catalyst, which comprises subjecting the naphthalene at a temperature above its melting point, to the action of metallic sodium capable of substantially removing said impurities from the naphthalene.

3. As a new product, naphthalene which, when thoroughly mixed with hot, strong sulfuric acid, does not show a substantial red coloration.

4. As a new product, naphthalene which, when thoroughly mixed with hot, strong sulfuric acid, does not show a substantial red coloration even on standing hot for several hours.

5. The method of purifying naphthalene to remove catalyzer poisons which comprises subjecting liquefied naphthalene to the action of a finely divided metal having an affinity for sulphur and sulphur compounds, and separating the thus purified naphthalene from the metal.

6. In a process for purifying naphthalene to remove catalyzer poisons the step of subjecting liquefied naphthalene to the action of a finely divided metal having an affinity for sulphur and sulphur compounds.

7. The method of purifying naphthalene which comprises subjecting naphthalene at a temperature above 100° C. to the action of a finely divided metal having an affinity for sulphur and sulphur compounds, and thereafter separating the thus purified naphthalene from the metal.

8. The method of purifying naphthalene to remove catalyzer poisons which comprises subjecting the naphthalene in the melted state to the action of a finely divided metal having an affinity for sulphur and sulphur compounds, and separating the purified product by distillation.

9. The method of purifying naphthalene to remove catalyzer poisons which comprises subjecting liquefied napthalene to the action of an easily melted metal having an affinity for sulphur and sulphur compounds, and separating the thus purified naphthalene from the metal.

10. In a process for purifying napthalene to remove catalyzer poisons, the step of subjecting liquefied naphthalene to the action of an easily melted metal having an affinity for sulphur and sulphur compounds.

11. The method of purifying naphthalene which comprises subjecting naphthalene at a temperature above 100° C. to the action of an easily melted metal having an affinity for sulphur and sulphur compounds, and thereafter separating the thus purified naphthalene from the metal.

12. The method of purifying naphthalene to remove catalyzer poisons which comprises subjecting the naphthalene in the melted state to the action of an easily melted metal having an affinity for sulphur and sulphur compounds, and separating the purified product by distillation.

13. The method of purifying naphthalene to remove catalyzer poisons which comprises subjecting liquefied naphthalene to the action of an easily melted alkali metal and separating the thus purified naphthalene from the metal.

14. In a process for purifying napthalene to remove catalyzer poisons, the step of subjecting liquefied naphthalene to the action of an easily melted alkali metal.

15. The method of purifying naphthalene which comprises subjecting naphthalene at a temperature above 100° C. to the action of an easily melted alkali metal, and thereafter separating the thus purified naphthalene from the metal.

16. The method of purifying naphthalene to remove catalyzer poisons which comprises subjecting the naphthalene in the melted state to the action of an easily melted alkali metal, and separating the purified product by distillation.

17. In a process for purifying naphthalene to remove catalyzer poisons the step of subjecting liquefied naphthalene to the action of metallic sodium.

18. The method of purifying naphthalene to remove catalyzer poisons which comprises subjecting the naphthalene in the melted state to the action of metallic sodium and separating the purified product by distillation.

19. As a new product, naphthalene which has been freed from catalyzer poisons, and which does not produce any substantial red coloration when thoroughly mixed with strong sulphuric acid.

In testimony whereof I have signed my name to this specification.

GEORG SCHROETER.